US010941805B2

(12) United States Patent
Schramm et al.

(10) Patent No.: US 10,941,805 B2
(45) Date of Patent: Mar. 9, 2021

(54) WING NUT

(71) Applicant: Caterpillar Inc., Deerfield, IL (US)

(72) Inventors: Zachary A. Schramm, Antioch, IL (US); Brian G. Tyler, Trevor, WI (US)

(73) Assignee: Caterpillar Inc., Peoria, IL (US)

( * ) Notice: Subject to any disclaimer, the term of this patent is extended or adjusted under 35 U.S.C. 154(b) by 227 days.

(21) Appl. No.: 16/153,992

(22) Filed: Oct. 8, 2018

(65) Prior Publication Data

US 2020/0109736 A1 Apr. 9, 2020

(51) Int. Cl.
*F16B 37/16* (2006.01)
*F16L 33/24* (2006.01)
*E21B 17/04* (2006.01)

(52) U.S. Cl.
CPC .............. *F16B 37/16* (2013.01); *F16L 33/24* (2013.01); *E21B 17/04* (2013.01)

(58) Field of Classification Search
CPC ...... F17B 37/16; F17B 23/0061; F16B 37/16; F16B 23/0061; F16L 33/24
USPC .................................................. 411/435, 408
See application file for complete search history.

(56) References Cited

U.S. PATENT DOCUMENTS

| | | | |
|---|---|---|---|
| 1,347,834 A | | 7/1920 | Barber |
| 4,253,353 A | * | 3/1981 | Symbol .................. B25B 19/00 81/124.7 |
| 4,362,043 A | | 12/1982 | Hanson |
| 4,549,754 A | | 10/1985 | Saunders et al. |
| 6,454,313 B1 | | 9/2002 | Dawson, Jr. et al. |
| 6,698,315 B1 | * | 3/2004 | Wright .................. B25B 13/065 81/121.1 |
| 6,945,569 B1 | | 9/2005 | Diaz et al. |
| 7,159,633 B2 | | 1/2007 | McGuire et al. |
| 7,568,874 B2 | * | 8/2009 | Riedel ................. F16B 23/0061 411/435 |
| 8,465,240 B2 | | 6/2013 | Corbett et al. |
| 9,109,727 B1 | | 8/2015 | Madson |
| 9,375,798 B2 | | 6/2016 | Mazzaferro et al. |

(Continued)

FOREIGN PATENT DOCUMENTS

| | | |
|---|---|---|
| DE | 4103266 A1 | 8/1992 |
| EP | 1260750 A1 | 11/2002 |

(Continued)

OTHER PUBLICATIONS

CNC Flow Control, "Flow Line Integral Hammer Union Swage (Male x Female)," produce page downloaded from the Internet at http://www.cncflowcontrol.com/products/flow-line-oil-field-products/integral-hammer-union-swage on Oc. 4, 2018, 2 pp. (2017).

(Continued)

*Primary Examiner* — Flemming Saether

(57) ABSTRACT

A wing nut includes a body having a sidewall that surrounds a central opening. The central opening is threaded along a threaded portion having a threaded length extending from the back end towards the front end of the body. At least two wings are integrated with the sidewall and extend away from the sidewall in a radial direction relative to the centerline. A rib extend peripherally around the sidewall in a radially outward direction such that a wall thickness of the sidewall increases to a maximum value moving along the centerline away from the rear end, and decreases along the centerline moving towards the front end from the maximum value.

11 Claims, 4 Drawing Sheets

(56) References Cited

U.S. PATENT DOCUMENTS

| | | |
|---|---|---|
| 9,782,876 B2 | 10/2017 | Francis et al. |
| 10,557,576 B2 * | 2/2020 | Witkowski .............. E21B 17/04 |
| 2009/0265891 A1 * | 10/2009 | Pett ........................ F16B 37/16 |
| | | 16/430 |
| 2015/0226355 A1 | 8/2015 | Ungchusri et al. |
| 2016/0377207 A1 | 12/2016 | Witkowski et al. |
| 2017/0314336 A1 | 11/2017 | Johnson et al. |

FOREIGN PATENT DOCUMENTS

| | | |
|---|---|---|
| GB | 2416574 B | 8/2008 |
| WO | WO 2013/116059 A1 | 8/2013 |
| WO | WO 2016/132745 A1 | 8/2016 |
| WO | WO 2016/205208 A1 | 12/2016 |

OTHER PUBLICATIONS

Jme Ellsworth, "Kemper Valve Figure 1502 Threaded Hammer Unions," product page downloaded from the Internet at https://www.jmesales.com/kemper-valve-figure-1502-threaded-hammer-unions/ on Oct. 4, 2018, 4 pp. (2018).

* cited by examiner

WING NUT

TECHNICAL FIELD

This patent disclosure relates generally to pumping conduits and, more particularly, to wing nuts used to connect conduit sections for pumping operations.

BACKGROUND

Pumping operations using conduits in which high, cyclically applied stresses are known. For example, pumping operations in industries like hydraulic fracking (or "fracking"), concrete pouring, well service, and others, include pumps that send fluids having high viscosity and/or under large pressure through conduits. The conduits are typically made from pipe sections that are connected to one another using threaded nuts. The nuts include wings that provide the ability to apply torque to tighten or loosen the nuts, often by use of a sledge hammer or a hydraulic hammer to provide the large impact loading or toque required to install or uninstall the nuts.

Traditionally, wing nuts for such pumping operations are known to have a limited service life due to the extreme conditions of their use and installation. Often, the wings on nuts become deformed from repeated loading during nut installation. Additionally, the nuts are prone to cracks when the pipe segments they are used to connect are subject to bending loads, and to fatigue failures when subjected to cyclical pressure loading from the incompressible fluid being pumped at high pressure within the pipe segments.

One example of a known wing nut can be seen in WO 2016/205208 ("Witkowski"), which describes a wing nut having a "full root radius" and an "increased wall thickness." While the wing nut of Witkowski may represent an improvement over known wing nuts, it is still ineffective in improving all aspects of use and operation of wing nuts.

SUMMARY

The disclosure describes, in one aspect, a wing nut. The wing nut includes a body having a generally cylindrical shape extending along a centerline. The body includes a sidewall that surrounds a central opening. The sidewall includes an outer peripheral surface having a front end and a rear end, and extending over a length along the centerline. The central opening is threaded along a threaded portion having a threaded length extending from the back end towards the front end, the threaded portion having a thread shape. At least two wings are integrated with the sidewall and extend away from the sidewall in a radial direction relative to the centerline. A rib extends peripherally around the sidewall, in a radially outward direction along an outer surface of the sidewall such that a wall thickness of the sidewall increases to a maximum value moving along the centerline away from the rear end, and decreases along the centerline moving towards the front end from the maximum value. The maximum value of the wall thickness is disposed at an axial location that overlaps an end of the threaded length.

In another aspect, the disclosure describes a wing nut. The wing nut includes a body having a generally cylindrical shape extending along a centerline. The body includes a sidewall that surrounds a central opening. The sidewall includes an outer peripheral surface having a front end and a rear end, and extending over a length along the centerline. The central opening is threaded along a threaded portion having a threaded length extending from the back end towards the front end. The threaded portion has a thread shape. Three wings are integrated with the sidewall and extend away from the sidewall in a radial direction relative to the centerline. Each wing has a curved outer face, which generally follows a circular shape of the sidewall. The thread shape includes a plurality of internal threads, each internal thread formed by an internal crest and a root portion. The internal crest is flat and the root portion is rounded such that the root portion is tangential to both adjacent thread flanks. The threaded portion terminates at a thread release undercut, which axially spans between the threaded portion and a flange. The flange is disposed adjacent the front end of the body. The body further comprises a guide bore defined axially between the flange and front end of the body.

In yet another aspect, the disclosure describes a wing nut. The wing nut includes a body having a generally cylindrical shape extending along a centerline. The body includes a sidewall that surrounds a central opening. The sidewall includes an outer peripheral surface having a front end and a rear end, and extends over a length along the centerline. The central opening is threaded along a threaded portion having a threaded length extending from the back end towards the front end, and has a thread shape. Three wings are integrated with the sidewall and extend away from the sidewall in a radial direction relative to the centerline. A rib extends peripherally around the sidewall. The rib extends radially outwardly along an outer surface of the sidewall such that a wall thickness of the sidewall increases to a maximum value moving along the centerline away from the rear end, and decreases along the centerline moving towards the front end from the maximum value. The maximum value of the wall thickness is disposed at an axial location that overlaps an end of the threaded length. Each wing has a curved outer face, which generally follows a circular shape of the sidewall. Each wing also has a corresponding lug centerline extending parallel to, but at an offset distance from, a corresponding radius of the central opening that intersects the centerline at a center point, and includes a forward facing side surface and a reverse facing side surface, the forward and reverse facing side surfaces being planar and each being parallel to the centerline. A width of each forward facing side face is larger than a width of each reverse facing side face.

DETAILED DESCRIPTION

This disclosure relates to pumping system conduits and, more particularly, to wing nuts for connecting segments of pipe or conduits such as those used in fracking, concrete pumping, well servicing and the like in the oil and gas, construction and other industries. In the embodiment illustrated herein, the wing nut is used on a hammer union for connecting two pipe segments that are used to transfer fluids under pressure during oilfield service or production operations.

Figure 1:
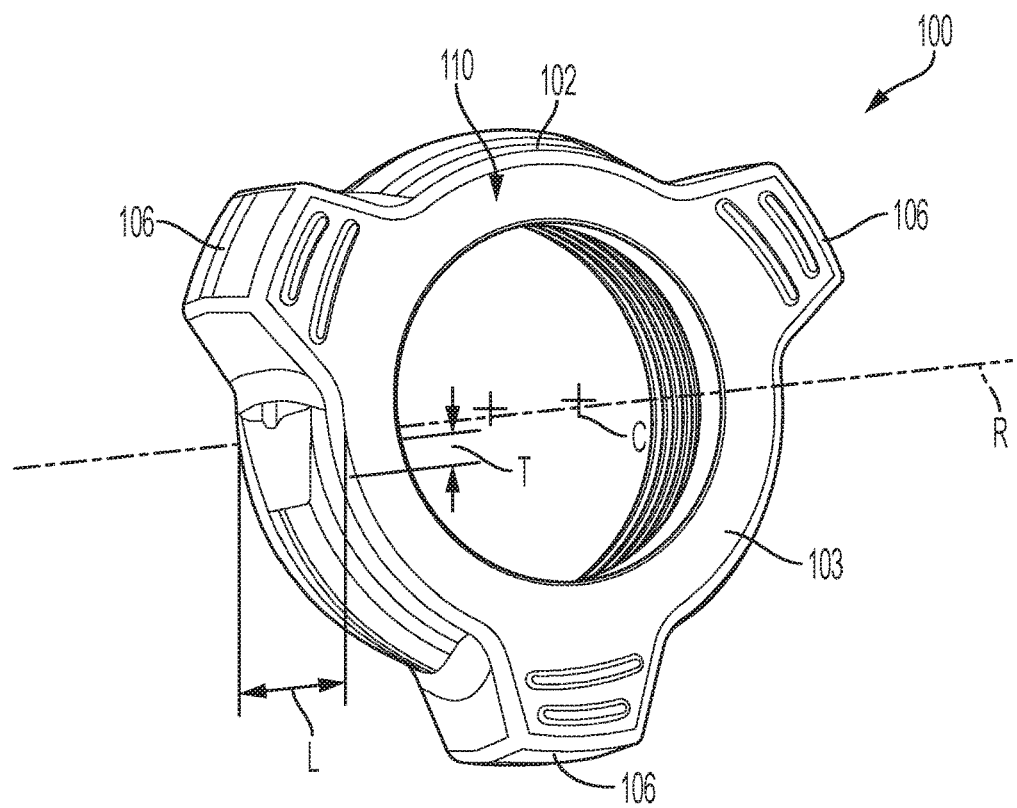
FIGS. 1 and 2 are outline views from different perspectives of a wing nut in accordance with the disclosure.
Figure 2:
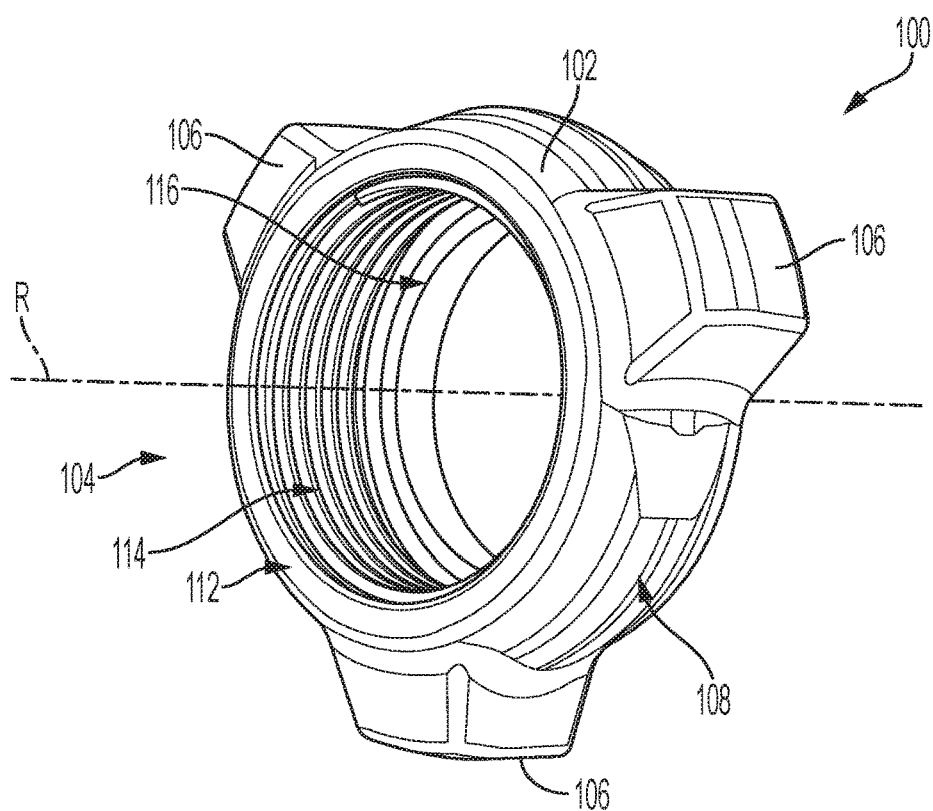

One embodiment of a wing nut 100 is shown in FIGS. 1 and 2 from a front and rear perspective to illustrate the major aspects thereof. The wing nut 100 includes a body 102 having a generally hollow cylindrical shape that includes a sidewall 103 and a threaded opening 104. The sidewall 103 is ring-shaped and has a length, L, along an axial direction of a centerline, R, and a wall thickness, T, in a radial direction relative to the centerline R. The wall thickness T varies along the length L of the wing nut, as is described in the description that follows in further detail.

The wing nut 100 includes three lugs or wings 106 disposed along an outer surface 108 of the sidewall 103 disposed along equally spaced angles along the periphery of the sidewall 103. Each of the three wings 106 extends axially along at least a portion of the length L of the body 102. The body 102 forms a front annular face 110 and a rear annular face 112, which are planar and perpendicular to the centerline R at either end of the body 102 in a lengthwise direction along the centerline R. The threaded opening 104 is surrounded by an internal threaded portion 114 and terminates at a flange 116 adjacent the front annular face 110.

Figure 3:
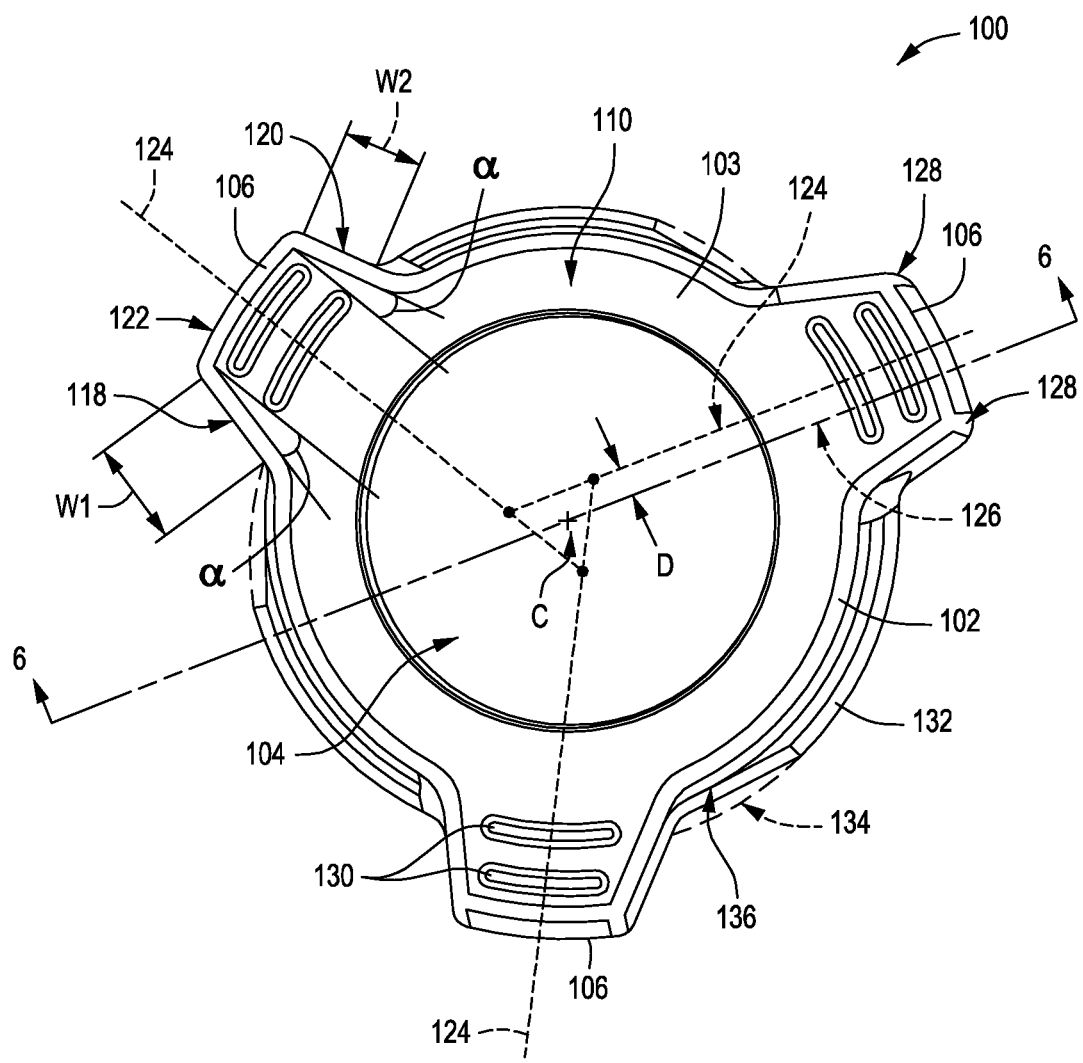
FIG. 3 is a front view of a wing nut in accordance with the disclosure.

An outline view from a front perspective of the wing nut 100 is shown in FIG. 3. As shown in this view, each wing 106 has a generally trapezoidal shape defined between a forward facing side face 118 and a reverse facing side face 120. During installation, a user may strike or otherwise engage the forward facing side face 118 and apply a force that produces a torque in a tightening direction to install the wing nut 100, which in the orientation shown in FIG. 3 would tend to turn the wing nut 100 in a clockwise direction. Similarly, striking or otherwise engaging the reverse facing side face 120 would produce a torque in a loosening direction to remove the wing nut 100, which in the orientation shown in FIG. 3 would tend to turn the wing nut 100 in a counter-clockwise direction. The shape of the wing 106 includes a curved outer face 122, which generally follows the circular shape of the sidewall 103 instead of being flat or, stated differently, instead of being parallel to a tangent of the outer periphery of the sidewall 103.

Each wing 106 has a corresponding lug centerline 124, which extends parallel to, but is offset by a distance, D, from a corresponding radius 126 that extends to the center point, C, of the threaded opening 104, which center point C also lies on the centerline R (FIG. 1). In other words, the three lug centerlines 124 of the three wings 106, if extended, would form an equilateral triangle (illustrated in FIG. 3), the center of which would coincide with the center point C. Because of the offset D between the lug centerline 124 and the corresponding radius 126, a width of the forward and reverse facing side faces 118 and 120 will differ, with a width W1 of each forward facing side face 118 being larger than the width W2 of each reverse facing side face 120. As a consequence, the forward facing side faces 118 present a larger strike target to facilitate tightening during installation of the wing nut 100.

Both the forward and reverse facing side faces 118 and 120 form an included angle, 2α, with the lug centerline, with each being disposed at an angle α relative to lug centerline 124. In the illustrated embodiment, the angle α is 15 degrees, but other angles may be used. The selection of a larger included angle will act to lengthen the widths W1 and W2. A larger offset distance D in the direction shown will lengthen the width W1 and shorten the width W2. It should be appreciated that, in the event a larger width is desired in the loosening direction, the offset may be taken on the opposite side of the centerline, in which case the width W2 will become larger than the width W1 (not shown). Stated differently, the lug and wing nut would appear as a mirror image of the embodiment shown herein.

Selection of the offset distance D, and also the included angle, is a matter of design choice and depends on the dimension or ratio between W1 and W2 that is desired for a particular application. It should be appreciated that, in addition to presenting a larger target for striking the wing nut in a tightening direction, the offset location of the wings also serves in internally redirecting the direction of application of the tightening impulse force in a more tangential direction relative to the threaded opening 104, which reduces internal stresses acting transversely within the sidewall 103. It should also be appreciated that the curved shape of the curved outer face 122 strengthens the outer corners 128 of each wing 106 by increasing their included angle and material thickness at each corner as compared to a wing design having a flat or tangentially-extending outer surface relative to the threaded opening 104.

Still in reference to FIG. 3, it can be seen that each forward-facing side of the wings 106 includes two raised ridges 130, which can provide visual contrast. Of course, the shape, orientation and number of ridges 130 may be different than what is shown in FIG. 3.

Figure 4:
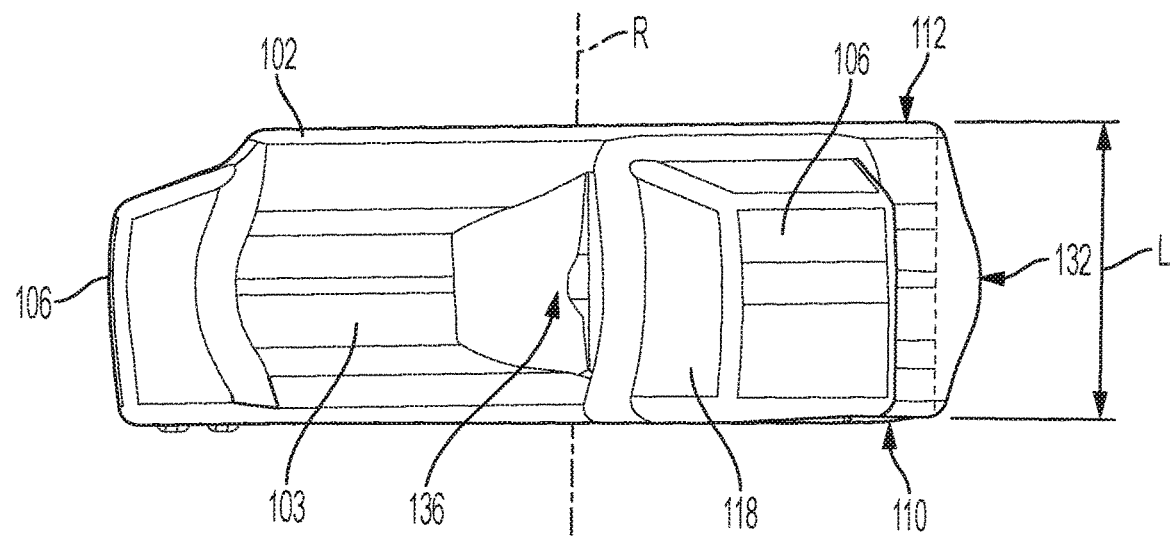
FIG. 4 is a side view of a wing nut in accordance with the disclosure.
Figure 5:
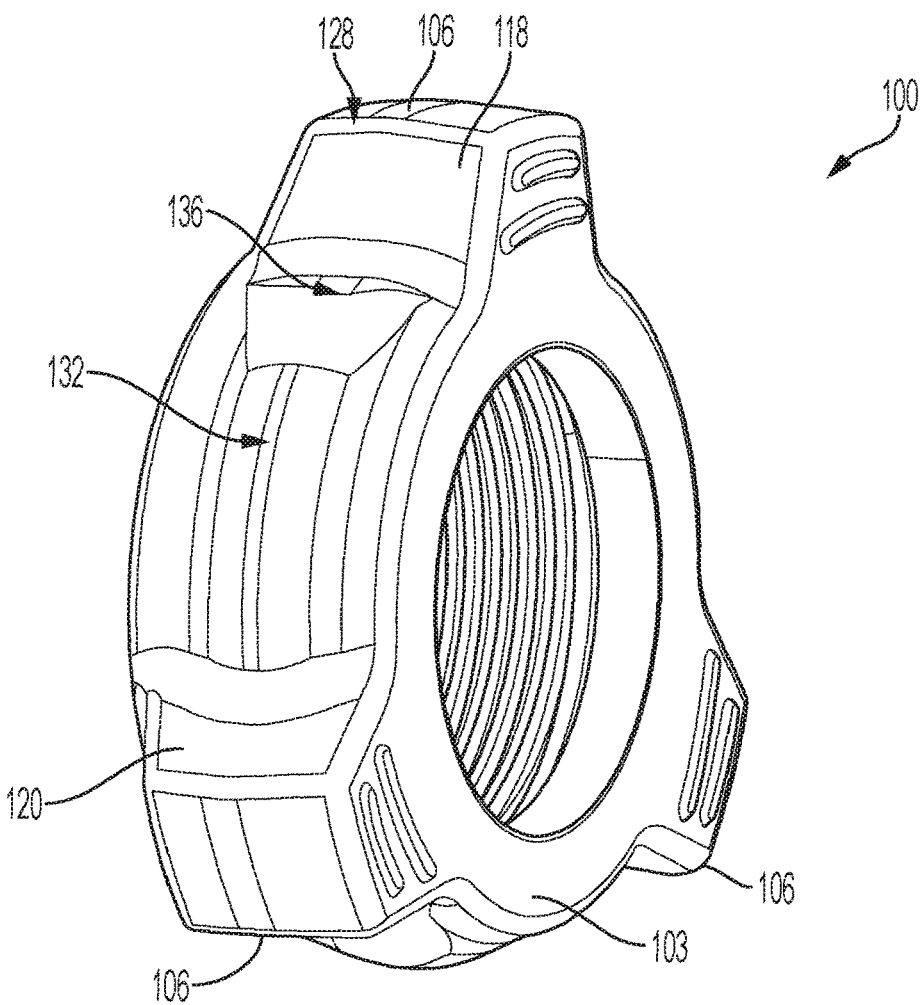
FIG. 5 is an outline view from a front and side perspective of a wing nut in accordance with the disclosure.

To further increase the strength and resilience of the wing nut 100, a rib 132 is disposed generally peripherally around the sidewall 103 at an axial location that lies generally at a termination of the threaded portion 114. More particularly, and in further reference to FIGS. 4, 5, and 6, the rib 132 may extend entirely in segments between adjacent wings 106, as shown by the dashed line 134 (shown in FIG. 3), or it may alternatively be interrupted by radial depressions 136 in areas adjacent the forward facing side face 118. As can be seen in FIG. 5, the radial depressions 136 decrease the height of the rib 132 to more readily provide access for the user to strike the forward facing side face 118 when installing the wing nut 100, to improve accuracy of the strike onto that surface, and to reduce the frequency of corner-only strikes, which traditionally have been known to lead to damage of wing nuts. As can be seen from FIG. 4, and also FIG. 6, a side profile of the rib 132 indicates that the wall thickness T of the sidewall tends to gradually increase and then gradually decrease along the axial length L of the body 102. A maximum thickness of the sidewall 103, which is referred to herein as the rib 132, is axially disposed around at a length of about 0.4*L from the front annular face 110, but other locations may be used. In the illustrated embodiment, the maximum thickness is axially located to overlap an end of the threaded length of the threaded portion 114 along the centerline.

Figure 6:
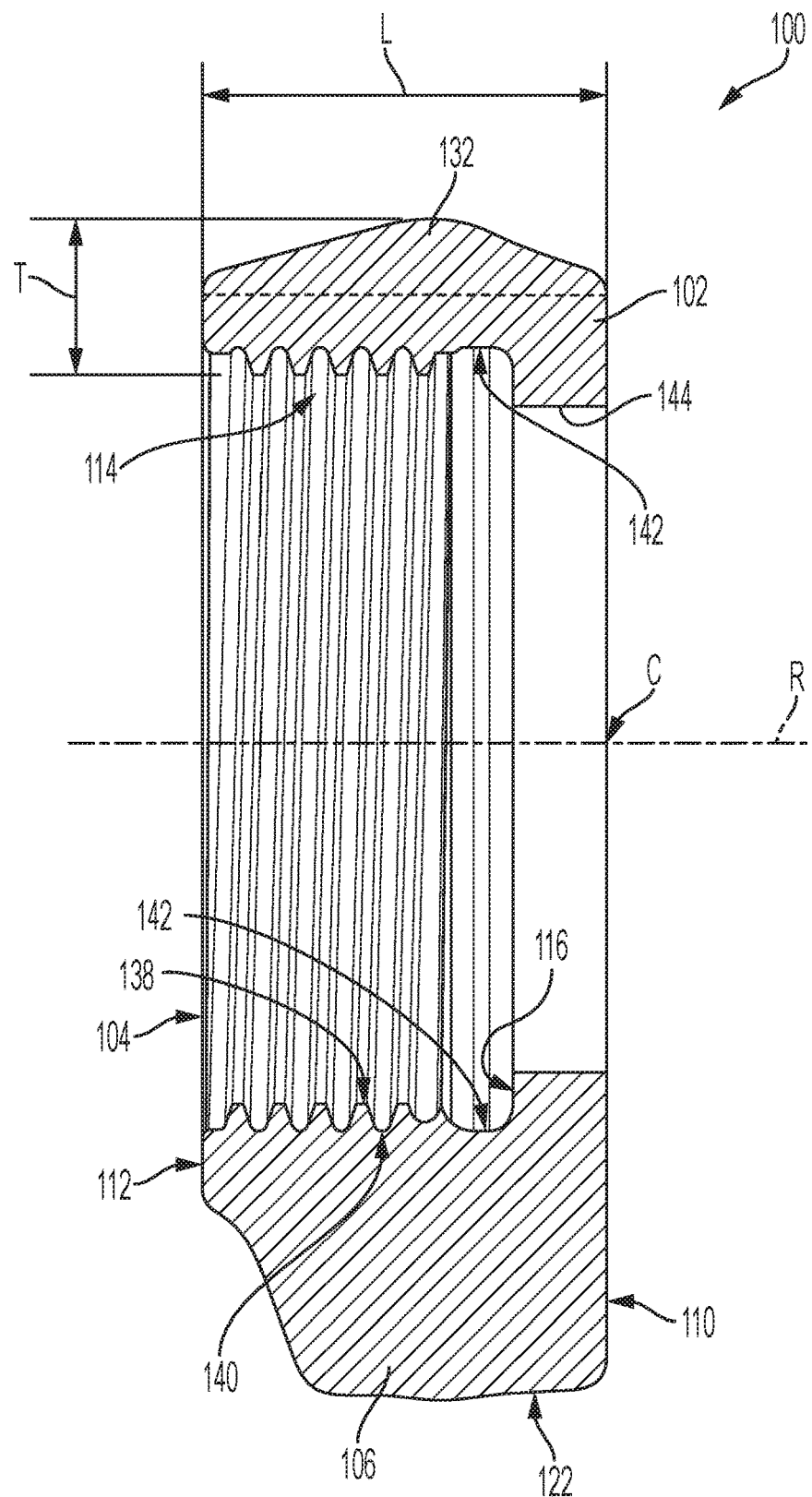
FIG. 6 is a sectional view of a wing nut in accordance with the disclosure.

Referring now to FIG. 6, which illustrates a cross section through the wing nut 100, it can be seen that the threaded portion 114 partially extends along an inner portion of the threaded opening 104 from the rear annular face 112 towards the front annular face 110 along the centerline R, and includes a plurality of internal threads. Each internal thread is made from an internal crest or inner diameter portion 138 and an outer diameter portion or root portion 140. The threads are designed according to a modified thread standard, for example, a J-series screw thread, in which the inner diameter portion 138 is flat, but the root portion 140 is rounded such that the root becomes is tangential to both adjacent thread side faces or flanks. In this way, sharp roots are avoided, which can create stress concentrations, and fatigue strength of the wing nut is improved.

The threaded portion 114 terminates at a thread release undercut 142, which as can be seen in FIG. 6 axially spans between the threaded portion 114 and the flange 116. The thread release undercut 142 is constructed to provide an unthreaded portion in which a leading portion of the mating inner thread (not shown) of the pipe segment (not shown) onto which the wing nut 100 will be installed may be disposed when the wing nut is installed to ensure that little deformation occurs in that area for a proper seating of the flange 116 against a blunt end flange of the pipe section. The thread release undercut 142 also provides clearance for a more precise cutting of the threaded portion 114. A guide bore 144 is axially disposed between the thread release undercut 142 and the front annular face 110. The guide bore 144 helps center and secure the wing nut 100 onto the pipe section (not shown) it connects.

INDUSTRIAL APPLICABILITY

The present disclosure applicable to wing nuts for use when connecting pipe sections or segments.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A wing nut, comprising:
a body having a generally cylindrical shape extending along a centerline, the body including a sidewall having an inner surface that defines a central opening, and an outer peripheral surface having a front end and a back end, the outer peripheral surface extending over a length along the centerline,
the inner surface of the sidewall being threaded along a threaded portion having a threaded length extending from the back end toward the front end, the threaded portion having a thread shape;
at least two wings integrated with the sidewall and extending away from the sidewall in a radial direction, the radial direction being transverse to the centerline,
each wing of the at least two wings including a forward facing side surface and a reverse facing side surface, the forward facing side surface facing away from the reverse facing side surface along a circumferential direction, the circumferential direction extending about the centerline; and
a rib extending peripherally around the sidewall, the rib extending radially outward along an outer surface of the sidewall such that a wall thickness of the sidewall increases to a maximum value moving along the centerline away from the back end, and decreases along the centerline moving toward the front end from the maximum value, wherein the maximum value of the wall thickness is disposed at an axial location that overlaps an end of the threaded length,
the rib extending in segments between adjacent wings around the sidewall and being interrupted by radial depressions in areas adjacent to each forward facing side surface of the at least two wings.

2. The wing nut of claim 1, wherein each wing has a curved outer face, the curved outer face generally following a circular shape of the sidewall.

3. The wing nut of claim 1, wherein each wing has a corresponding lug centerline extending parallel to, but at an offset distance from, a corresponding radius of the central opening that intersects the centerline at a center point, and the forward and reverse facing side surfaces are planar.

4. The wing nut of claim 3, wherein the at least two wings includes three wings disposed at equal angular intervals around a periphery of the sidewall, each wing of the three wings having a corresponding lug centerline, wherein the centerlines of the three wings, if extended, form an equilateral triangle having a center that coincides with the center point.

5. The wing nut of claim 4, wherein a width of each forward facing side surface is larger than a width of each reverse facing side surface.

6. The wing nut of claim 5, wherein the forward facing side surface and a corresponding lug centerline define a forward angle,
the reverse facing side surface and the corresponding lug centerline define a reverse angle,
the forward facing side surface and the reverse facing side surface define an included angle,
the forward angle equals the reverse angle, and
the included angle equals twice the forward angle.

7. The wing nut of claim 6, wherein the forward angle is 15 degrees.

8. The wing nut of claim 1, wherein the thread shape includes a plurality of internal threads, each internal thread of the plurality of internal threads being formed by an internal crest and a root portion, and
wherein the internal crest is flat and the root portion is rounded such that the root portion is tangential to adjacent thread flanks.

9. The wing nut of claim 1, wherein the threaded portion terminates at a thread release undercut, the thread release undercut axially spanning between the threaded portion and a flange, the flange being disposed adjacent to the front end of the body.

10. The wing nut of claim 9, further comprising a guide bore defined axially between the flange and front end of the body.

11. A wing nut, comprising:
a body having a generally cylindrical shape extending along a centerline, the body including a sidewall having an inner surface that defines a central opening, and an outer peripheral surface having a front end and a back end, the outer peripheral surface extending over a length along the centerline,
the inner surface of the sidewall being threaded along a threaded portion having a threaded length extending from the back end toward the front end, the threaded portion having a thread shape;

three wings integrated with the sidewall and extending away from the sidewall in a radial direction, the radial direction being transverse to the centerline, each wing of the three wings including a forward facing side surface and a reverse facing side surface, the forward facing side surface facing away from the reverse facing side surface along a circumferential direction, the circumferential direction extending about the centerline; and a rib extending peripherally around the sidewall, the rib extending radially outward along an outer surface of the sidewall such that a wall thickness of the sidewall increases to a maximum value moving along the centerline away from the back end, and decreases along the centerline moving towards the front end from the maximum value, wherein the maximum value of the wall thickness is disposed at an axial location that overlaps an end of the threaded length, wherein each wing has a curved outer face, the curved outer face generally following a circular shape of the sidewall, wherein each wing has a corresponding lug centerline extending parallel to, but at an offset distance from, a corresponding radius of the central opening that intersects the centerline at a center point, the forward and reverse facing side surfaces being planar, wherein a width of each forward facing side surface is larger than a width of each reverse facing side surface, and wherein the rib extends in segments between adjacent wings around the sidewall and is interrupted by radial depressions in areas adjacent to the forward facing side surface of each wing.

* * * * *